(12) United States Patent
Furui et al.

(10) Patent No.: US 12,335,646 B2
(45) Date of Patent: Jun. 17, 2025

(54) ELECTRONIC DEVICE AND OPERATING METHOD THEREOF

(71) Applicant: Innolux Corporation, Miaoli County (TW)

(72) Inventors: Yuko Furui, Miaoli County (TW); Hidetoshi Watanabe, Miaoli County (TW); Akihiro Iwatsu, Miaoli County (TW); Shuji Hagino, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 121 days.

(21) Appl. No.: 18/321,795

(22) Filed: May 23, 2023

(65) Prior Publication Data

US 2024/0397224 A1 Nov. 28, 2024

(51) Int. Cl.
*H04N 25/709* (2023.01)
*H04N 25/77* (2023.01)
*H04N 25/78* (2023.01)

(52) U.S. Cl.
CPC ........... *H04N 25/709* (2023.01); *H04N 25/77* (2023.01); *H04N 25/78* (2023.01)

(58) Field of Classification Search
None
See application file for complete search history.

(56) References Cited

U.S. PATENT DOCUMENTS

| 2004/0135913 | A1 | 7/2004 | Shinotsuka et al. | |
| 2017/0244918 | A1* | 8/2017 | Sakuragi | H04N 25/77 |
| 2019/0238778 | A1* | 8/2019 | Duan | H04N 5/32 |
| 2020/0007801 | A1* | 1/2020 | Duan | H04N 25/616 |
| 2020/0103275 | A1* | 4/2020 | Fujimoto | H04N 25/709 |
| 2021/0266480 | A1* | 8/2021 | Sun | H04N 25/709 |

* cited by examiner

*Primary Examiner* — Paul M Berardesca
(74) *Attorney, Agent, or Firm* — JCIPRNET (57) ABSTRACT

An electronic device and an operating method thereof are provided. The electronic device includes a driving transistor and a preset transistor. The operating method includes the following steps: turning on the preset transistor, and providing a first voltage to a control terminal of the driving transistor; turning off the preset transistor, and providing a second voltage to the driving transistor, wherein the first voltage is greater than the second voltage; executing a sensing process; and executing a scan process to provide an output signal.

15 Claims, 7 Drawing Sheets

ELECTRONIC DEVICE AND OPERATING METHOD THEREOF

BACKGROUND

Technical Field

The disclosure relates a device; particularly, the disclosure relates to an electronic device and an operating method thereof.

Description of Related Art

For a general active pixel sensor (APS), since the active pixel sensor has the threshold voltage (Vth) problem of the driving transistor, such as in-plain Vth variation due to process and Vth degradation caused by various factors (e.g. static destruction, irradiation etc.), which greatly affects the sensing quality of image sensing results.

SUMMARY

The operating method of the disclosure is adapted to the electronic device. The electronic device includes a driving transistor and a preset transistor. The operating method includes the following step: turning on the preset transistor, and providing a first voltage to a control terminal of the driving transistor; turning off the preset transistor, and providing a second voltage to the driving transistor, wherein the first voltage is greater than the second voltage; executing a sensing process; and executing a scan process to provide an output signal.

The electronic device of the disclosure includes a preset transistor and a driving transistor. The driving transistor is electrically connected to the preset transistor. A first voltage is provided to a control terminal of the driving transistor when the preset transistor is turned on. A second voltage is provided to the driving transistor when the preset transistor is turned off. The first voltage is greater than the second voltage.

Based on the above, according to the operating method and the electronic device of the disclosure, the electronic device can provide a good image sensing function.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

Figure 1:
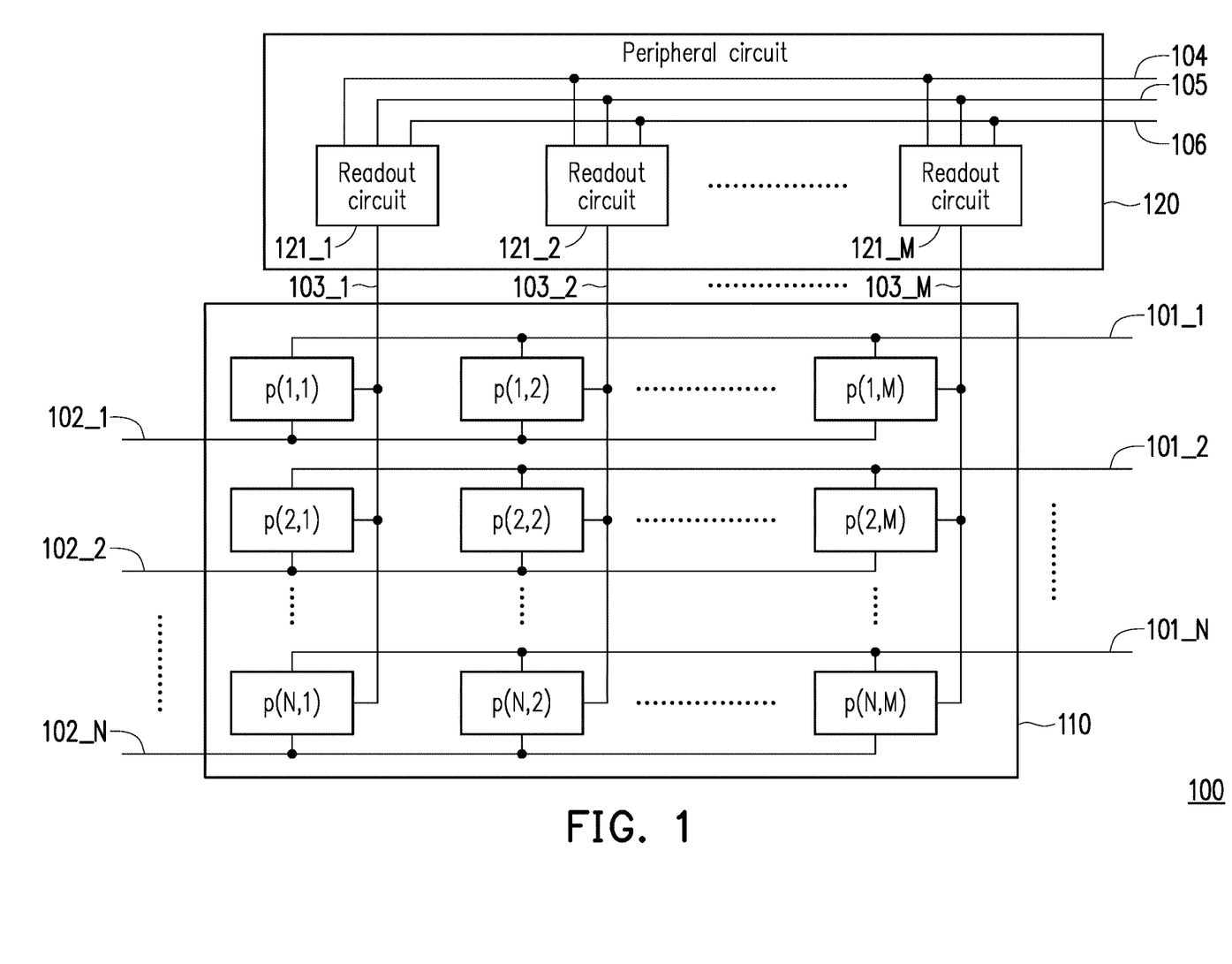
FIG. 1 is a schematic diagram of an electronic device according to an embodiment of the disclosure.

FIG. 1 is a schematic diagram of an electronic device according to an embodiment of the disclosure. Referring to FIG. 1, the electronic device 100 may be an active pixel sensor (APS), and may be manufactured by thin-film transistor (TFT) process, but the disclosure is not limited thereto. The electronic device 100 includes an active area and a peripheral area, a (active matrix (AM)) pixel array 110 is located in the active area, and a peripheral circuit 120 is located in the peripheral area. The pixel array 110 is electrically connected to the peripheral circuit 120. The pixel array 110 includes a plurality of pixel units p(1,1) to p(N,M), a plurality of reset signal lines 101_1 to 101_N, a plurality of read signal lines 102_1 to 102_N and a plurality of data signal lines 103_1 to 103_M, wherein M and N are positive integers. The peripheral circuit 120 includes a plurality of readout circuits 121_1 to 121_M, a preset signal line 104, a preset voltage line 105 and a readout control line 106. In the embodiment of the disclosure, one row of the pixel units p(1,1) to p(N,M) is electrically connected to corresponding one of the reset signal lines 101_1 to 101_N and corresponding one of the read signal lines 102_1 to 102_N. One column of the pixel units p(1,1) to p(N,M) is electrically connected to corresponding one of the readout circuits 121_1 to 121_M through a corresponding one of the data signal lines 103_1 to 103_M. In the embodiment of the disclosure, the readout circuits 121_1 to 121_M are electrically connected to the preset signal line 104, the preset voltage line 105 and the readout control line 106.

Figure 2:
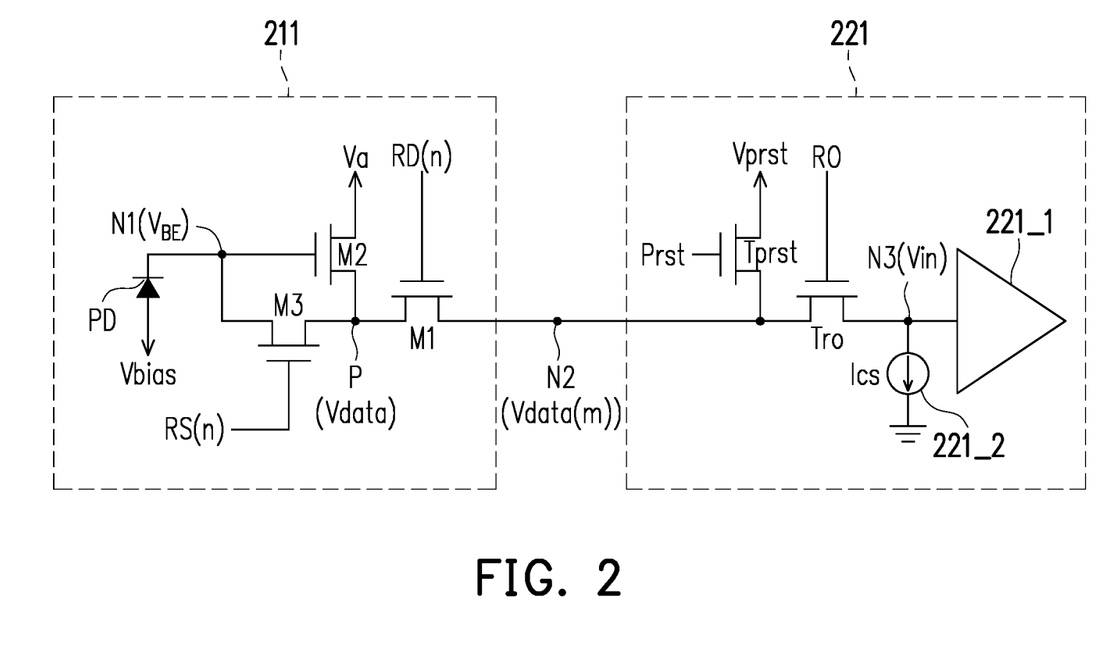
FIG. 2 is a schematic diagram of a pixel circuit and a readout circuit according to an embodiment of the disclosure.

FIG. 2 is a schematic diagram of a pixel circuit and a readout circuit according to an embodiment of the disclosure. Referring to FIG. 1 and FIG. 2, the specific circuit architecture of at least one of the pixel units p(1,1) to p(N,M) and corresponding one of the readout circuits 121_1 to 121_M of FIG. 1 may be implemented as the pixel unit 211 and readout circuit 221 of FIG. 2. The pixel unit 211 may be a pixel at n-th row and m-th column in the pixel array 110. In the embodiment of the disclosure, the pixel unit 211 includes a read transistor M1, a driving transistor M2, a reset transistor M3 and a sensing unit PD. A first terminal of the read transistor M1 is electrically connected to the driving transistor M2 and the reset transistor M3 through a circuit node P. A second terminal of the read transistor M1 is electrically connected to the readout circuit 221 through a circuit node N2 and the data signal line 103_m, wherein m is an integer between 1 and M. A control terminal of the read transistor M1 is configured to receive a read signal RD(n) from the read signal line 102_n, wherein n is an integer between 1 and N. A first terminal of the driving transistor M2 is configured to receive an adjustable voltage Va. A second terminal of the driving transistor M2 is electrically connected to the read transistor M1 and the reset transistor M3 through the circuit node P. A control terminal of the driving transistor M2 is electrically connected to the sensing unit PD and the reset transistor M3 through a circuit node N1. A first terminal of the reset transistor M3 is electrically connected to the read transistor M1 and the driving transistor M2 through the circuit node P. A second terminal of the reset transistor M3 is electrically connected to the sensing unit PD and the driving transistor M2 through the circuit node N1. To be more specific, reset transistor M3 is electrically connected between the second terminal and the control terminal of the driving transistor M2. A control terminal of the reset transistor M3 is configured to receive a reset signal RS(n) from the reset signal line 101_n. An anode of the sensing unit PD is electrically connected to a bias voltage Vbias. A cathode of the sensing unit PD is electrically connected to the driving transistor M2 and the reset transistor M3 through the circuit node N1.

In the embodiment of the disclosure, the peripheral circuit 120 includes a preset transistor Tprst, a readout transistor Tro, an amplifier circuit 221_1 and a current source 221_2. The preset transistor Tprst is included in the peripheral circuit 120, but the disclosure is not limited thereto. A first terminal of the preset transistor Tprst is configured to receive a preset voltage Vprst from the preset voltage line 105. A second terminal of the preset transistor Tprst is electrically connected to the circuit node N2 and the readout transistor Tro. A control terminal of the preset transistor Tprst is configured to receive a preset signal Prst from the preset signal line 104. A first terminal of the readout transistor Tro is electrically connected to the circuit node N2 and the preset transistor Tprst. A second terminal of the readout transistor Tro is electrically connected to the amplifier circuit 221_1 and the current source 221_2 through a circuit node N3. A control terminal of the readout transistor Tro is configured to receive a readout signal RO from the readout control line 106. An input terminal of the amplifier circuit 221_1 is electrically connected to the readout transistor Tro and the current source 221_2 through the circuit node N3. The current source 221_2 is electrically connected between the circuit node N3 and a ground or a power supply, and configured to generate a constant current Ics flowing from the circuit node N3 toward the ground or the power supply.

In the embodiment of the disclosure, the read transistor M1, the driving transistor M2, the reset transistor M3, the preset transistor Tprst and the readout transistor Tro may be N-type transistors, but the disclosure is not limited thereto. In the embodiment of the disclosure, the first terminal and the second terminal of one of the above transistors may be a drain terminal and a source terminal respectively, and the control terminal of the transistor may be a gate terminal, but the disclosure is not limited thereto. In one embodiment of the disclosure, at least one of the read transistor M1, the driving transistor M2, the reset transistor M3, the preset transistor Tprst and the readout transistor Tro may be a P-type transistor. In the embodiment of the disclosure, the sensing unit PD may be a photodiode, but the disclosure is also not limited thereto.

Figure 3:
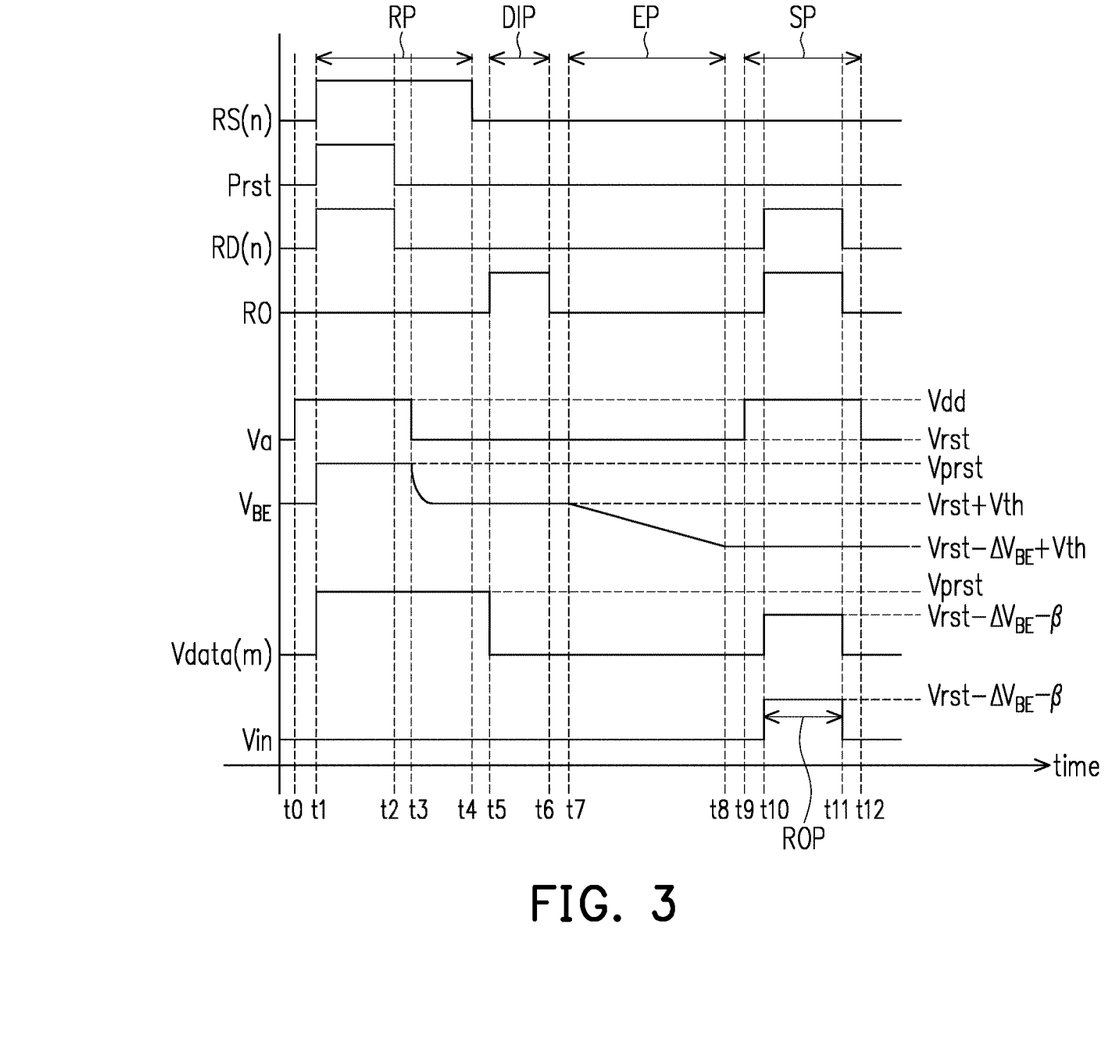
FIG. 3 is a schematic diagram of voltage variation according to the embodiment of FIG. 2 of the disclosure.
Figure 4:
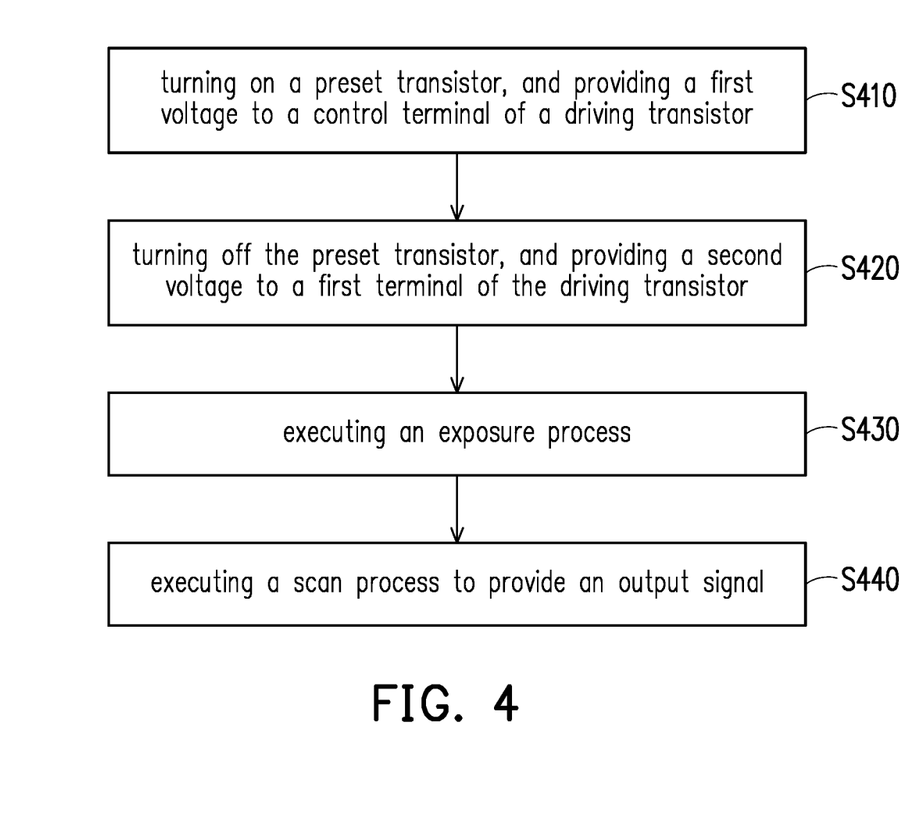
FIG. 4 is a flowchart of an operating method according to an embodiment of the disclosure.

FIG. 3 is a schematic diagram of voltage variation according to the embodiment of FIG. 2 of the disclosure. FIG. 4 is a flowchart of an operating method according to an embodiment of the disclosure. Referring to FIG. 1 to FIG. 4, the pixel unit 211 and the readout circuit 221 of FIG. 2 may perform the following steps S410 to S440. In step S410, the preset transistor Tprst may be turned on, and a first voltage (voltage $V_{BE}$ of the circuit node N1) may be provided to the control terminal of the driving transistor M2. As shown in FIG. 3, the pixel unit 211 may operate a reset process during a reset period RP from time t1 to time t4, and the reset process includes a preset process during the period from time t1 to time t2. During the period from time t0 to time t3, the adjustable voltage Va may be changed from a reset voltage Vrst to an operation voltage Vdd. However, in one embodiment of the disclosure, the first terminal of the driving transistor M2 may also be changed to a floating state (i.e. high impedance). During the period from time t1 to time t2, the reset signal RS(n), the preset signal Prst and the read signal RD(n) may be changed from a low voltage level to a high voltage level respectively, and the readout signal RO may be maintained at the low voltage level. Thus, the read transistor M1, the reset transistor M3 and the preset transistor Tprst may be turned on, and the readout transistor Tro may be turned off, and the preset voltage Vprst (i.e. the first value) may be provided to the control terminal of the driving transistor M2. In other words, the voltage value of the first voltage (i.e. voltage $V_{BE}$ of the circuit node N1) is at a first value equal to the preset voltage Vprst. The preset transistor Tprst is turned on during at least a part of the reset process. It should be noted that in FIG. 3, both the preset transistor Tprst and the read transistor M1 are turned on during a part of the reset process, but since the preset voltage Vprst may be provided to the control terminal of the driving transistor M2 when the preset transistor Tprst, the read transistor M1 and the reset transistor M3 are all turned on, it may be that only one of the preset transistor Tprst and the read transistor M1 is turned on during a part of the reset process, another one of them is turned on during all the reset process. On the other hand, the control terminal and the second terminal of the driving transistor M2 may be short-circuited by the turned on reset transistor M3, since the driving transistor M2 has a symmetrical structure in principle, the driving transistor M2 can be regarded as an equivalent diode with exchanged source and drain. A cathode terminal of the equivalent diode corresponds to the first terminal of the driving transistor M2. An anode terminal of the equivalent diode corresponds to the control terminal and the second terminal of the driving transistor M2. Thus, due to the operation voltage Vdd is greater than the preset voltage Vprst, the equivalent diode is operated in reverse bias, and there is no current flowing through the equivalent diode. Therefore, a voltage $V_{BE}$ (i.e. the first voltage) of the circuit node N1 is equal to the preset voltage Vprst during the period from time t1 to time t3. It should be noted that since the transistors in the disclosure are N-type transistors, the term "low voltage level" in the disclosure is referred to a voltage level to turn off the N-type transistor (for example, a ground), and the term "high voltage level" in the disclosure is referred to a voltage level high enough to turn on the N-type transistor.

In step S420, the preset transistor Tprst may be turned off, and a second voltage may be provided to a first terminal of the driving transistor M2. As shown in FIG. 3, during the period from time t3 to time t4, the adjustable voltage Va may be changed from the operation voltage Vdd to the reset voltage Vrst. During the period from time t2 to time t4, the preset signal Prst and the read signal RD(n) may be changed from the high voltage level to the low voltage level respectively, the reset signal RS(n) may be maintained at the high voltage level, and the readout signal RO may be maintained at the low voltage level. Thus, the reset transistor M3 may be turned on, and the read transistor M1, the preset transistor Tprst and the readout transistor Tro may be turned off, and the reset voltage Vrst (i.e. the second voltage) may be provided to the first terminal of the driving transistor M2. More specifically, the control terminal and the second terminal of the driving transistor M2 may also be short-circuited by the turned on reset transistor M3, and the driving transistor M2 may also be operated as the equivalent diode. Thus, due to the reset voltage Vrst is smaller than the preset voltage Vprst, the equivalent diode is operated in forward bias, and there is a diode current flowing through the equivalent diode. Therefore, the voltage $V_{BE}$ (i.e. the first voltage) of the circuit node N1 is pulled down after time t3, and after certain time, the voltage $V_{BE}$ (i.e. the first voltage) of the circuit node N1 is equal to the voltage (i.e. the second value) of the reset voltage Vrst plus a threshold voltage Vth (i.e. Vrst+Vth) of the driving transistor M2. That is, the voltage $V_{BE}$ (i.e. the first voltage) of the circuit node N1 is reduced from the preset voltage Vprst (i.e. the first value) to the voltage (i.e. the second value) of the reset voltage Vrst plus a threshold voltage Vth (i.e. Vrst+Vth) when the reset voltage Vrst is provided to the driving transistor M2. Therefore, the second value of the first voltage (Vrst+Vth) is greater than a voltage value of the second voltage (Vrst).

Moreover, during the period from time t1 to time t5, the voltage Vdata(m) of the circuit node N2 is equal to the preset voltage Vprst. Then, during a data initialization period DIP from time t5 to time t6, the electronic device 100 may operate a data initialization process. During the data initialization period DIP from time t5 to time t6, the reset signal RS(n), the preset signal Prst and the read signal RD(n) may be maintained at the low voltage level respectively, and the readout signal RO may be changed from the low voltage level to the high voltage level. Thus, the read transistor M1, the reset transistor M3 and the preset transistor Tprst may be turned off, and the readout transistor Tro may be turned on, and the voltage Vdata(m) of the circuit node N2 is pulled down from the preset voltage Vprst to a low voltage level (i.e. ground voltage).

In step S430, the pixel unit 211 executes a sensing process. As shown in FIG. 3, the electronic device 100 may operate the sensing process during an exposure period EP from time t7 to time t8, and the sensing unit PD may provide a sensing signal (sensing current) corresponding to a sensing result to the control terminal of the driving transistor M2. During the exposure period EP from time t7 to time t8, the reset signal RS(n), the preset signal Prst, the read signal RD(n) and the readout signal RO may be maintained at the low voltage level. Thus, the voltage $V_{BE}$ (i.e. the first voltage) of the circuit node N1 is further reduced from the voltage (i.e. the second value) of the reset voltage Vrst plus a threshold voltage Vth (i.e. Vrst+Vth) to the voltage (i.e. the third value) of the reset voltage Vrst minus a sensing voltage $\Delta V_{BE}$ and plus a threshold voltage Vth (i.e. Vrst−$\Delta V_{BE}$+Vth). The sensing voltage $\Delta V_{BE}$ represents a voltage variation due to the sensing result of the sensing unit PD.

In step S440, the pixel unit 211 executes a scan process to provide an output signal. As shown in FIG. 3, the pixel unit 211 may operate a scan process during a scan period SP from time t9 to time t12. During the scan period SP from time t9 to time t12, the adjustable voltage Va may be changed from the reset voltage Vrst to the operation voltage Vdd. During a readout period ROP from time t10 to time t11, the read signal RD(n) and the readout signal RO may be changed from the low voltage level to the high voltage level respectively, and the reset signal RS(n) and the preset signal Prst may be maintained at the low voltage level. Thus, the read transistor M1 and the readout transistor Tro may be turned on, and the reset transistor M3 and the preset transistor Tprst may be turned off, and the readout circuit 221 may readout the output signal with the voltage Vdata(m) through the circuit node N2 according to the voltage $V_{BE}$ (i.e. the first voltage) of the circuit node N1. More specifically, the constant current Ics is flowing through the driving transistor M2, the read transistor M1 and the readout transistor Tro and toward the current source 221_2. The driving transistor M2 may act as a source follower in the saturation region, and the voltage Vdata(m) of the circuit node N2 is pulled up from the low voltage level to the voltage of the reset voltage Vrst minus the sensing voltage $\Delta V_{BE}$ and minus a transistor voltage β (i.e. (Vrst−$\Delta V_{BE}$+Vth)−Vth−β=Vrst−$\Delta V_{BE}$−β). That is, the threshold voltage Vth can be excluded in the voltage Vdata(m). The transistor voltage β may be expressed in the following equation (1), wherein the symbol L represents a gate width of the driving transistor M2, the symbol W represents a channel width of the driving transistor M2, the symbol u represents an electron mobility and the symbol Cox represents a capacitance per unit area of the gate insulator of the driving transistor M2.

$$\beta = \sqrt{\frac{2 \cdot I_{CS} \cdot L}{W \cdot \mu \cdot Cox}} \qquad \text{equation (1)}$$

Therefore, the input terminal of the amplifier circuit 221_1 may receive an input voltage Vin from the circuit node N3, and the input voltage Vin is equal to the voltage Vdata(m) (i.e. Vrst−$\Delta V_{BE}$−β). That is, the readout circuit 221 may generate the sensing data that is not affected by the threshold voltage Vth of the driving transistor M2.

Figure 5:
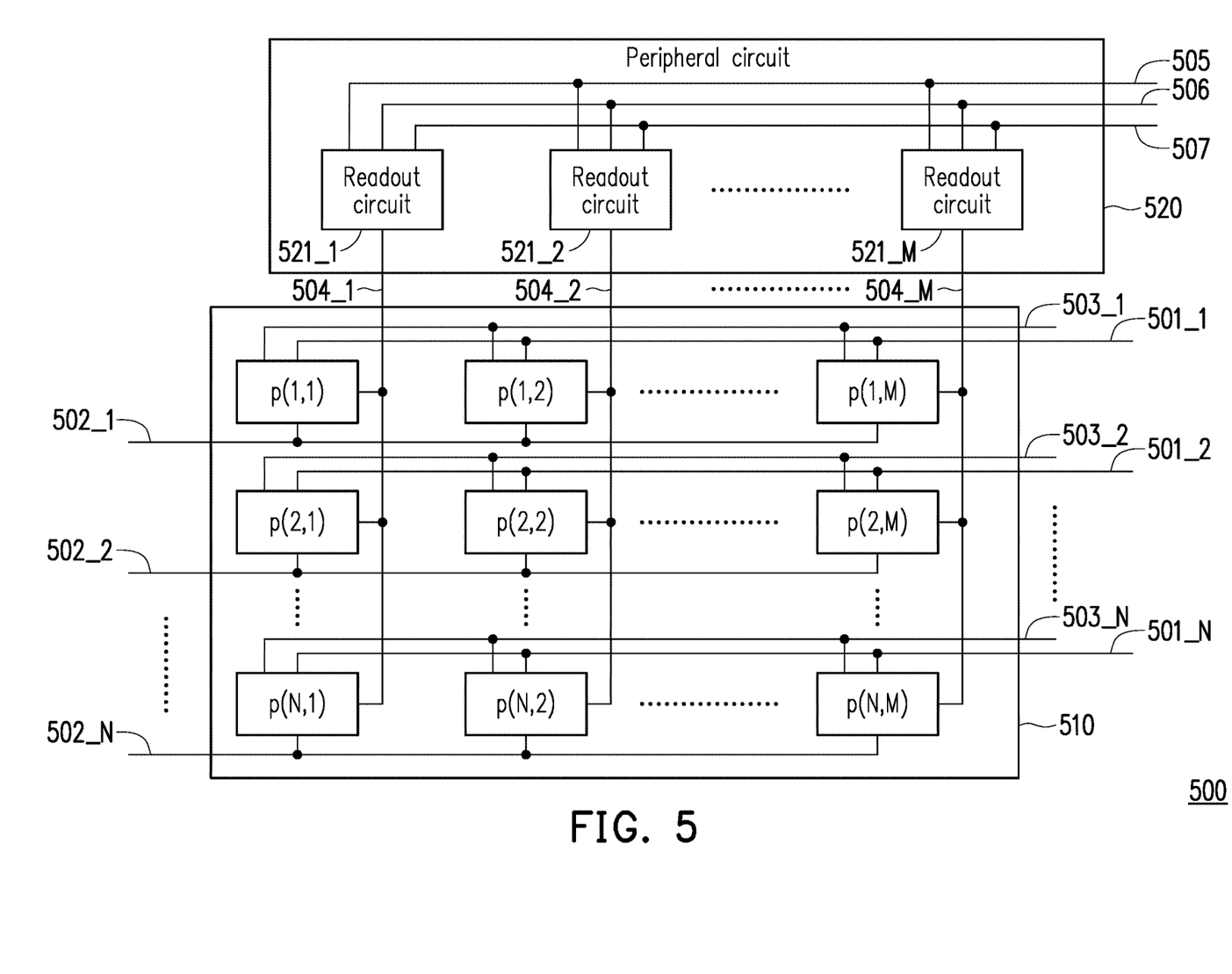
FIG. 5 is a schematic diagram of an electronic device according to another embodiment of the disclosure.

FIG. 5 is a schematic diagram of an electronic device according to another embodiment of the disclosure. Referring to FIG. 5, the electronic device 500 may be an APS, and includes a (active matrix (AM)) pixel array 510 and a peripheral circuit 520. The pixel array 510 is electrically connected to the peripheral circuit 520. The pixel array 510 includes a plurality of pixel units p(1,1) to p(N,M), a plurality of reset signal lines 501_1 to 501_N, a plurality of read signal lines 502_1 to 502_N, a plurality of preset signal lines 503_1 to 503_N and a plurality of data signal lines 504_1 to 504_M, wherein M and N are positive integers. The peripheral circuit 520 includes a plurality of readout circuits 521_1 to 521_M, a reset control line 505, a reset voltage line 506 and a readout control line 507. In the embodiment of the disclosure, one row of the pixel units p(1,1) to p(N,M) is electrically connected to corresponding one of the reset signal lines 501_1 to 501_N, corresponding one of the read signal lines 502_1 to 502_N and corresponding one of the preset signal lines 503_1 to 503_N. One column of the pixel units p(1,1) to p(N,M) is electrically connected to corresponding one of the readout circuits 521_1 to 521_M through a corresponding one of the data signal lines 504_1 to 504_M. In the embodiment of the disclosure, the readout circuits 521_1 to 521_M are electrically connected to the reset control line 505, the reset voltage line 506 and the readout control line 507.

Figure 6:
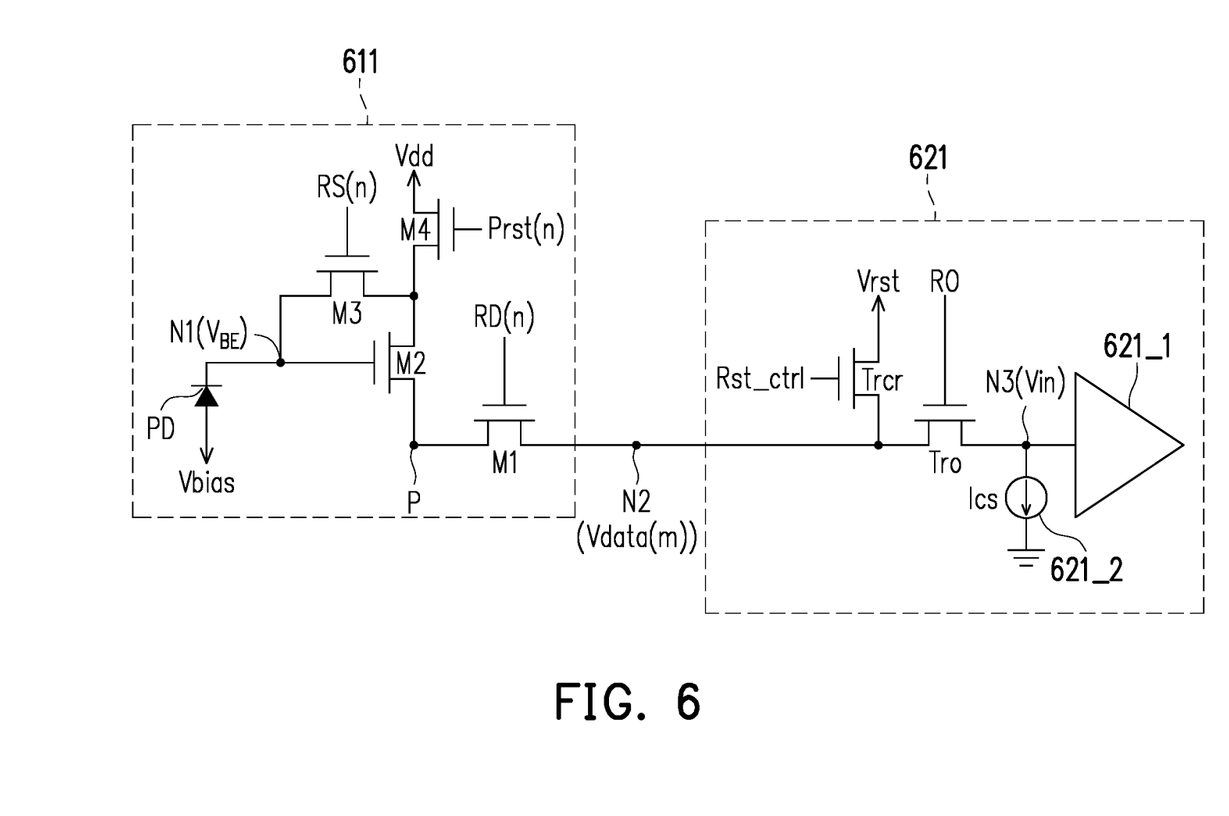
FIG. 6 is a schematic diagram of a pixel circuit and a readout circuit according to another embodiment of the disclosure.

FIG. 6 is a schematic diagram of a pixel circuit and a readout circuit according to another embodiment of the disclosure. Referring to FIG. 5 and FIG. 6, the specific circuit architecture of at least one of the pixel units p(1,1) to p(N,M) and corresponding one of the readout circuits 521_1 to 521_M of FIG. 5 may be implemented as the pixel unit 611 and readout circuit 621 of FIG. 6. The pixel unit 611 may be a pixel at n-th row and m-th column in the pixel array 510. In the embodiment of the disclosure, the pixel unit 611 includes a read transistor M1, a driving transistor M2, a reset transistor M3, a preset transistor M4 and a sensing unit PD. A first terminal of the read transistor M1 is electrically connected to the driving transistor M2 through a circuit node P. A second terminal of the read transistor M1 is electrically connected to the readout circuit 621 through a circuit node N2 and the data signal line 504_m, wherein m is an integer between 1 and M. A control terminal of the read transistor M1 is configured to receive a read signal RD(n) from the read signal line 502_n, wherein n is an integer between 1 and N. A first terminal of the driving transistor M2 is electrically connected to the preset transistor M4 and the reset transistor M3. A second terminal of the driving transistor M2 is electrically connected to the read transistor M1 through the circuit node P. A control terminal of the driving transistor M2 is electrically connected to the sensing unit PD and the reset transistor M3 through a circuit node N1. A first terminal of the reset transistor M3 is electrically connected to the sensing unit PD and the driving transistor M2 through the circuit node N1. A second terminal of the reset transistor M3 is electrically connected to the driving transistor M2 and the preset transistor M4. A control terminal of the reset transistor M3 is configured to receive a reset signal RS(n) from the reset signal line 501_n. A first terminal of the preset transistor M4 is configured to receive an operation voltage Vdd. A second terminal of the preset transistor M4 is electrically connected to the driving transistor M2 and the reset transistor M3. A control terminal of the preset transistor M4 is configured to receive a preset signal Prst(n) from the preset signal line 503_n. An anode of the sensing unit PD is electrically connected to a bias voltage Vbias. A cathode of the sensing unit PD is electrically connected to the driving transistor M2 and the reset transistor M3 through the circuit node N1.

In the embodiment of the disclosure, the readout circuit 621 in the peripheral circuit 520 includes a reset control transistor Trcr, a readout transistor Tro, an amplifier circuit 621_1 and a current source 621_2. A first terminal of the reset control transistor Trcr is configured to receive a reset voltage Vrst from the reset voltage line 506. A second terminal of the reset control transistor Trcr is electrically connected to the circuit node N2 and the readout transistor Tro. A control terminal of the reset control transistor Trcr is configured to receive a reset control signal Rst_ctrl from the reset control line 505. A first terminal of the readout transistor Tro is electrically connected to the circuit node N2 and the reset control transistor Trcr. A second terminal of the readout transistor Tro is electrically connected to the amplifier circuit 621_1 and the current source 621_2 through a circuit node N3. A control terminal of the readout transistor Tro is configured to receive a readout signal RO from the readout control line 507. An input terminal of the amplifier circuit 621_1 is electrically connected to the readout transistor Tro and the current source 621_2 through the circuit node N3. The current source 621_2 is electrically connected between the circuit node N3 and a ground or a power supply, and configured to generate a constant current Ics flowing from the circuit node N3 to the ground or a power supply.

In the embodiment of the disclosure, the read transistor M1, the driving transistor M2, the reset transistor M3, the preset transistor M4, the reset control transistor Trcr and the readout transistor Tro may be N-type transistors, but the disclosure is not limited thereto. In the embodiment of the disclosure, the first terminal and the second terminal of the above transistors may be a drain terminal and a source terminal respectively, and the control terminal of the transistor may be a gate terminal, but the disclosure is not limited thereto. In one embodiment of the disclosure, at least one of the read transistor M1, the driving transistor M2, the reset transistor M3, the preset transistor M4, the reset control transistor Trcr and the readout transistor Tro may be a P-type transistor. In the embodiment of the disclosure, the sensing unit PD may be a photodiode, but the disclosure is also not limited thereto.

Figure 7:
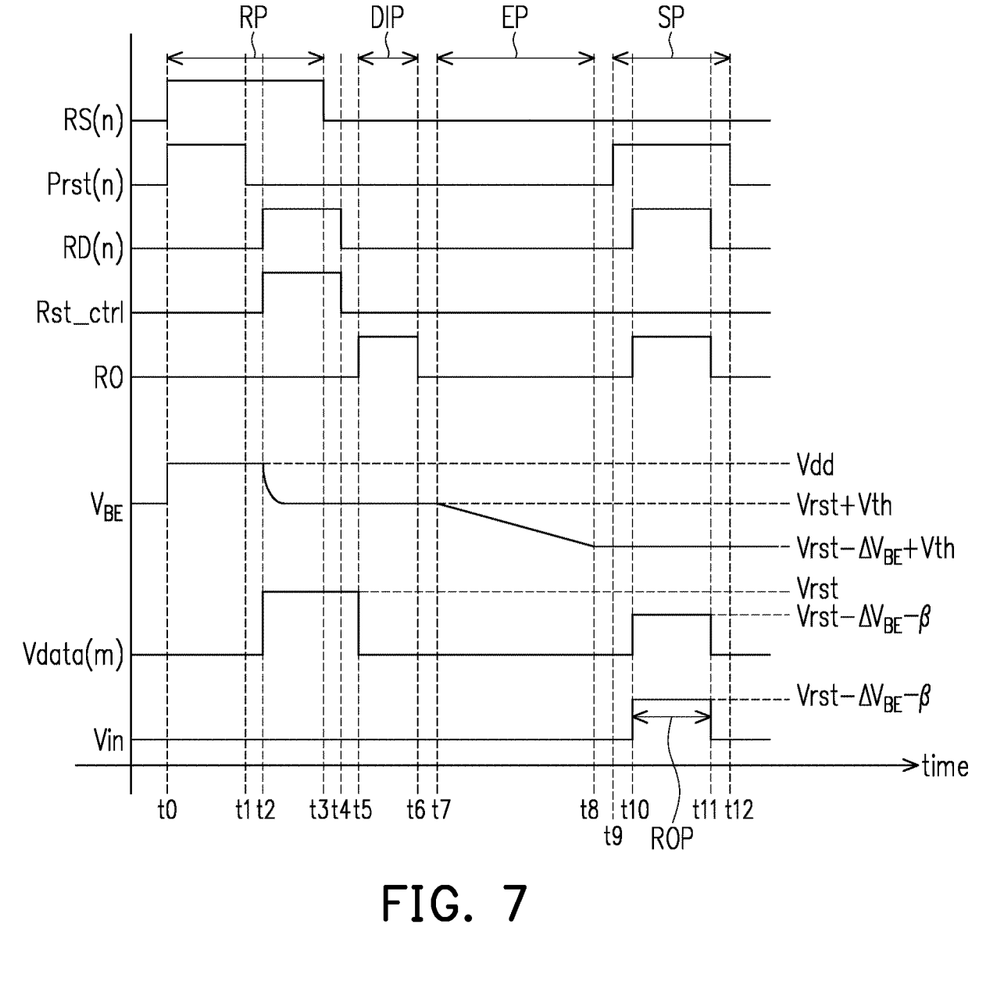
FIG. 7 is a schematic diagram of voltage variation according to the embodiment of FIG. 6 of the disclosure.

FIG. 7 is a schematic diagram of voltage variation according to the embodiment of FIG. 6 of the disclosure. Referring to FIG. 4 to FIG. 7, the pixel unit 611 and the readout circuit 621 of FIG. 6 may perform the following steps S410 to S440. In step S410, the preset transistor M4 may be turned on, and a first voltage may be provided to the control terminal of the driving transistor M2. As shown in FIG. 7, the pixel unit 611 may operate a reset process during a reset period RP from time t0 to time t3, and the reset process includes a preset process during the period from time t0 to time t1. During the period from time t0 to time t1, the reset signal RS(n) and the preset signal Prst(n) may be changed from a low voltage level to a high voltage level respectively, and the read signal RD(n), the readout signal RO and the reset control signal Rst_ctrl may be maintained at the low voltage level. Thus, the reset transistor M3 and the preset transistor M4 may be turned on, and the read transistor M1, the reset control transistor Trcr and the readout transistor Tro may be turned off, and the operation voltage Vdd (i.e. the first value) may be provided to the control terminal of the driving transistor M2. The preset transistor M4 is turned on during the reset process. More specifically, the control terminal and the first terminal of the driving transistor M2 may be short-circuited by the turned on reset transistor M3, and the driving transistor M2 may be operated as an equivalent diode. A cathode terminal of the equivalent diode corresponds to the second terminal (drain terminal) of the driving transistor M2. An anode terminal of the equivalent diode corresponds to the control terminal and the first terminal of the driving transistor M2. Because the Read transistor M1 is turned off, there is no current flowing through the equivalent diode. Therefore, a voltage $V_{BE}$ (i.e.

the first voltage) of the circuit node N1 is equal to the operation voltage Vdd during the period from time t0 to time t2.

In step S420, the preset transistor M4 may be turned off, and a second voltage may be provided to the driving transistor M2. As shown in FIG. 7, during the period from time t2 to time t3, the preset signal Prst(n) may be changed from the high voltage level to the low voltage level, the reset signal RS(n) may be maintained at the high voltage level, and the read signal RD(n) and the reset control signal Rst_ctrl may be changed from the low voltage level to the high voltage level. Thus, the read transistor M1, the reset transistor M3 and the reset control transistor Trcr may be turned on, and the preset transistor M4 and the readout transistor Tro may be turned off, and the reset voltage Vrst (i.e. the second voltage) may be provided to the driving transistor M2. More specifically, the control terminal and the first terminal of the driving transistor M2 may also be short-circuited by the turned on reset transistor M3, and the driving transistor M2 may also be operated as the equivalent diode. Thus, due to the reset voltage Vrst is smaller than the voltage of the first terminal of the driving transistor M2, the equivalent diode is operated in forward bias, and there is a diode current flowing through the equivalent diode. Therefore, the voltage $V_{BE}$ (i.e. the first voltage) of the circuit node N1 is pulled down after time t3, and after certain time, the voltage $V_{BE}$ (i.e. the first voltage) of the circuit node N1 is equal to the voltage (i.e. the second value) of the reset voltage Vrst plus a threshold voltage Vth (i.e. Vrst+Vth) of the driving transistor M2. That is, the voltage $V_{BE}$ (i.e. the first voltage) of the circuit node N1 is reduced from the operation voltage Vdd (i.e. the first value) to the voltage (i.e. the second value) of the reset voltage Vrst plus a threshold voltage Vth (i.e. Vrst+Vth) when the reset voltage Vrst is provided to the driving transistor M2.

Moreover, during the period from time t2 to time t5, the voltage Vdata(m) of the circuit node N2 is equal to the reset voltage Vrst. Then, during a data initialization period DIP from time t5 to time t6, the electronic device 500 may operate a data initialization process. During the data initialization period DIP from time t5 to time t6, the reset signal RS(n), the preset signal Prst(n), the read signal RD(n) and the reset control signal Rst_ctrl may be maintained at the low voltage level respectively, and the readout signal RO may be changed from the low voltage level to the high voltage level. Thus, the read transistor M1, the reset transistor M3, the preset transistor M4 and the reset control transistor Trcr may be turned off, and the readout transistor Tro may be turned on, and the voltage Vdata(m) of the circuit node N2 is pulled down from the reset voltage Vrst to a low voltage level (i.e. ground voltage).

In step S430, the pixel unit 611 executes a sensing process. As shown in FIG. 7, the electronic device 500 may operate the sensing process during an exposure period EP from time t7 to time t8, and the sensing unit PD may provide a sensing signal (sensing current) corresponding to a sensing result to the control terminal of the driving transistor M2. During the exposure period EP from time t7 to time t8, the reset signal RS(n), the preset signal Prst(n), the read signal RD(n) and the readout signal RO may be maintained at the low voltage level. Thus, the voltage $V_{BE}$ (i.e. the first voltage) of the circuit node N1 is further reduced from the voltage (i.e. the second value) of the reset voltage Vrst plus a threshold voltage Vth (i.e. Vrst+Vth) to the voltage (i.e. the third value) of the reset voltage Vrst minus a sensing voltage $\Delta V_{BE}$ and plus a threshold voltage Vth (i.e. Vrst−$\Delta V_{BE}$+Vth). The sensing voltage $\Delta V_{BE}$ represents a voltage variation due to the sensing result of the sensing unit PD.

In step S440, the pixel unit 611 executes a scan process to provide an output signal. As shown in FIG. 7, the pixel unit 611 may operate a scan process during a scan period SP from time t9 to time t12. During the scan period SP from time t9 to time t12, the preset signal Prst(n) may be changed from the low voltage level to the high voltage level to turn on the preset transistor M4. During a readout period ROP from time t10 to time t11, the read signal RD(n) and the readout signal RO may be changed from the low voltage level to the high voltage level respectively, and the reset signal RS(n), and the reset control signal Rst_ctrl may be maintained at the low voltage level. Thus, the read transistor M1, the preset transistor M4 and the readout transistor Tro may be turned on, and the reset transistor M3 and the reset control transistor Trcr may be turned off, and the readout circuit 621 may readout the output signal with the voltage Vdata(m) through the circuit node N2 according to the voltage $V_{BE}$ (i.e. the first voltage) of the circuit node N1. More specifically, the constant current Ics is flowing through the preset transistor M4, the driving transistor M2, the read transistor M1 and the readout transistor Tro and toward the current source 621_2. The driving transistor M2 may act as a source follower in the saturation region, and the voltage Vdata(m) of the circuit node N2 is pulled up from the low voltage level (i.e. ground voltage) to the voltage of the reset voltage Vrst minus the sensing voltage $\Delta V_{BE}$ and minus a transistor voltage β (i.e. (Vrst−$\Delta V_{BE}$+Vth)−Vth−β=Vrst−$\Delta V_{BE}$−β). That is, the threshold voltage Vth can be excluded in the voltage Vdata(m). The transistor voltage β may be expressed in the above equation (1).

Therefore, the input terminal of the amplifier circuit 621_1 may receive an input voltage Vin from the circuit node N3, and the input voltage Vin is equal to the voltage Vdata(m) (i.e. Vrst−$\Delta V_{BE}$−β). That is, the readout circuit 621 may generate the sensing data that is not affected by the threshold voltage Vth of the driving transistor M2.

In summary, the electronic device and the operating method thereof of the disclosure can effectively eliminate or reduce the threshold voltage (Vth) problem of the driving transistor, so as to effectively improve the sensing quality of image sensing results.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An operating method of an electronic device, wherein the electronic device comprises a driving transistor, a preset transistor and a reset transistor electrically connected between a second terminal of the driving transistor and a control terminal of the driving transistor, and the operating method comprises:
   turning on the reset transistor during a reset process;
   turning on the preset transistor, and providing the first voltage to a control terminal of the driving transistor;
   turning off the preset transistor, and providing a second voltage to a first terminal of the driving transistor, wherein a voltage value of the first voltage is greater than a voltage value of the second voltage;
   executing a sensing process; and
   executing a scan process to provide an output signal, wherein the voltage value of the first voltage is reduced from a first value to a second value when the second voltage is provided to the first terminal of the driving transistor, wherein the preset transistor is turned on during at least a part of the reset process, and the voltage value of the first voltage is the first value when the preset transistor is turned on.

2. The operating method according to claim 1, wherein the second value is greater than the voltage value of the second voltage.

3. The operating method according to claim 1, wherein the electronic device further comprises a sensing unit, the sensing unit is electrically connected to the control terminal of the driving transistor.

4. The operating method according to claim 3, wherein the sensing unit provides a sensing signal during the sensing process, and the sensing signal makes the voltage value of the first voltage reduced from the second value to a third value.

5. The operating method according to claim 1, wherein the driving transistor is located in an active area of the electronic device, and the preset transistor is located in a peripheral area of the electronic device.

6. The operating method according to claim 1, wherein the driving transistor is located in an active area of the electronic device, and the preset transistor is located in the active area of the electronic device.

7. The operating method according to claim 6, wherein during the scan process, the preset transistor is turned on.

8. An electronic device, comprising:
a preset transistor;
a driving transistor, electrically connected to the preset transistor; and
a reset transistor, electrically connected between a second terminal of the driving transistor and a control terminal of the driving transistor,
wherein a first voltage is provided to the control terminal of the driving transistor when the preset transistor is turned on, and a second voltage is provided to a first terminal of the driving transistor when the preset transistor is turned off, wherein a voltage value of the first voltage is greater than a voltage value of the second voltage,
wherein the voltage value of the first voltage is reduced from a first value to a second value when the second voltage is provided to the first terminal of the driving transistor,
wherein the reset transistor is turned on during a reset process, the preset transistor is turned on during at least a part of the reset process, and the voltage value of the first voltage is the first value when the preset transistor is turned on.

9. The electronic device according to claim 8, wherein the second value is greater than the voltage value of the second voltage.

10. The electronic device according to claim 8, further comprising
a sensing unit, electrically connected to the control terminal of the driving transistor.

11. The electronic device according to claim 10, wherein the sensing unit is configured to provide a sensing signal during a sensing process, and the sensing signal makes the voltage value of the first voltage reduced from the second value to a third value.

12. The electronic device according to claim 8, wherein the driving transistor is located in an active area of the electronic device, and the preset transistor is located in a peripheral area of the electronic device.

13. The electronic device according to claim 8, wherein the driving transistor is located in an active area of the electronic device, and the preset transistor is located in the active area of the electronic device.

14. The electronic device according to claim 13, wherein the preset transistor is turned on during a scan process.

15. An electronic device, comprising:
a preset transistor;
a driving transistor, electrically connected to the preset transistor; and
a sensing unit, electrically connected to a control terminal of the driving transistor,
wherein a first voltage is provided to the control terminal of the driving transistor when the preset transistor is turned on, and a second voltage is provided to a first terminal of the driving transistor when the preset transistor is turned off, wherein a voltage value of the first voltage is greater than a voltage value of the second voltage,
wherein the voltage value of the first voltage is reduced from a first value to a second value when the second voltage is provided to the first terminal of the driving transistor,
wherein the sensing unit is configured to provide a sensing signal during a sensing process, and the sensing signal makes the voltage value of the first voltage reduced from the second value to a third value.

* * * * *